(12) United States Patent
Parsons et al.

(10) Patent No.: US 6,508,272 B1
(45) Date of Patent: Jan. 21, 2003

(54) DEVICE AND METHOD FOR OPERATING AT LEAST TWO VALVES

(75) Inventors: Natan E. Parsons, Brookline, MA (US); David Hadley, Franklin, MA (US); Robert Shamitz, Brighton, MA (US)

(73) Assignee: Arichell Technologies, Inc., West Newton, MA (US)

( * ) Notice: Subject to any disclaimer, the term of this patent is extended or adjusted under 35 U.S.C. 154(b) by 0 days.

(21) Appl. No.: 09/718,026

(22) Filed: Nov. 20, 2000

(51) Int. Cl.[7] .................. F16K 11/02; F16K 31/128
(52) U.S. Cl. ................ 137/595; 137/607; 251/30.04
(58) Field of Search .......................... 137/595, 607; 251/30.04, 30.05

(56) References Cited

U.S. PATENT DOCUMENTS

| | | | |
|---|---|---|---|
| 2,496,553 A | 2/1950 | Littlefield | |
| 3,472,277 A | 10/1969 | Reinicke et al. | 137/595 |
| 3,550,901 A | 12/1970 | McIntosh | 251/38 |

(List continued on next page.)

FOREIGN PATENT DOCUMENTS

| | | |
|---|---|---|
| EP | 0401468 A2 | 12/1990 |
| WO | WO 85/01337 | 3/1985 |
| WO | WO 87/05352 | 9/1987 |
| WO | WO 89/02086 | 3/1989 |
| WO | WO 91/17377 | 11/1991 |
| WO | WO 91/17380 | 11/1991 |
| WO | WO 91/17458 | 11/1991 |
| WO | WO 92/17656 | 10/1992 |
| WO | WO 99/61938 | 12/1999 |
| WO | WO 00/38561 | 7/2000 |
| WO | WO 00/38562 | 7/2000 |

*Primary Examiner*—Stephen M. Hepperle
(74) *Attorney, Agent, or Firm*—Ivan D. Zitkovsky

(57) ABSTRACT

Disclosed is a valve device and a method for operating at least two valves actuated by an actuator and arranged for controlling fluid flow in at least two separate fluid lines. The valve device can simultaneously control at least two diaphragm operated valves using a single actuator. The valve device includes a pressure release mechanism constructed to change pressure in a diaphragm chamber of each diaphragm operated valve and thereby open or close the diaphragm operated valve.

21 Claims, 14 Drawing Sheets

U.S. PATENT DOCUMENTS

| | | | |
|---|---|---|---|
| 4,116,377 A | 9/1978 | Andersson et al. | 236/12 A |
| 4,223,698 A | 9/1980 | Reinicke | 137/595 |
| 4,225,111 A | 9/1980 | Stahle | 251/87 |
| 4,408,745 A | 10/1983 | Swiers et al. | 251/357 |
| 4,520,516 A | 6/1985 | Parsons | 4/623 |
| 4,543,991 A | 10/1985 | Fuchs | 137/595 |
| 4,604,735 A | 8/1986 | Parsons | 367/93 |
| 4,669,653 A | 6/1987 | Avelov | 236/12.13 |
| 4,681,141 A | 7/1987 | Wang | 137/607 |
| 4,709,728 A | 12/1987 | Ying-Chung | 137/636.4 |
| 4,901,750 A | 2/1990 | Nicklas et al. | 137/270 |
| 4,953,141 A | 8/1990 | Novak et al. | 367/108 |
| 4,962,790 A | 10/1990 | Chou et al. | 137/599 |
| 5,062,164 A | 11/1991 | Lee et al. | 4/194 |
| 5,092,560 A | 3/1992 | Chen | 251/30.03 |
| 5,095,944 A | 3/1992 | Hochstrasser | 137/607 |
| 5,111,846 A * | 5/1992 | Hochstrasser et al. | 137/607 |
| 5,125,621 A | 6/1992 | Parsons et al. | 251/30.03 |
| 5,181,538 A * | 1/1993 | Manganaro | 137/607 |
| 5,251,188 A | 10/1993 | Parsons et al. | 367/140 |
| 5,255,398 A | 10/1993 | Flynn et al. | 4/496 |
| 5,299,592 A | 4/1994 | Swanson | 137/59 |
| 5,329,965 A | 7/1994 | Gordon | 137/599 |
| 5,339,859 A | 8/1994 | Bowman | 137/337 |
| 5,456,279 A | 10/1995 | Parsons et al. | 137/245 |
| 5,456,448 A | 10/1995 | Chou | 251/230 |
| 5,464,041 A | 11/1995 | Reinicke | 137/595 |
| 5,467,799 A | 11/1995 | Buccicone et al. | 137/625.41 |
| 5,511,579 A | 4/1996 | Price | 137/337 |
| 5,535,781 A | 7/1996 | Paterson et al. | 137/624.11 |
| 5,564,462 A | 10/1996 | Storch | 137/337 |
| 5,595,216 A | 1/1997 | Pilolla | 137/607 |
| 5,599,003 A | 2/1997 | Seemann et al. | 251/30.03 |
| D381,008 S | 7/1997 | Parsons et al. | D13/153 |
| 5,655,747 A | 8/1997 | Pasut | 251/30.03 |
| D396,090 S | 7/1998 | Marcichow et al. | D23/233 |
| 5,775,372 A | 7/1998 | Houlihan | 137/624.12 |
| 5,883,557 A | 3/1999 | Pawlak et al. | 335/179 |
| 5,979,500 A | 11/1999 | Jahrling et al. | 137/624.12 |
| 5,984,262 A | 11/1999 | Parsons et al. | 251/129.04 |
| 6,039,067 A | 3/2000 | Houlihan | 137/337 |
| 6,085,790 A | 7/2000 | Humpert et al. | 137/801 |
| 6,123,839 A | 9/2000 | Sussman | 210/136 |
| 6,298,872 B1 | 10/2001 | Keller | 137/360 |

* cited by examiner

DEVICE AND METHOD FOR OPERATING AT LEAST TWO VALVES

BACKGROUND OF THE INVENTION

The present invention relates to a valve device and a method for operating at least two fluid valves using a single actuator.

In public facilities or large private facilities, automatic water dispensing systems have provided numerous advantages including improved sanitation, water conservation, and reduced maintenance cost. Since numerous infectious diseases are transmitted by contact, public-health authorities have encouraged the public and mandated to food workers the exercise of proper hygiene including washing hands effectively. Effective hand washing has been made easier by automatic faucets. Automatic faucets typically include an object sensor that detects presence of an object, and an automatic valve that turns water on and off based on a signal from the sensor. If the water temperature in an automatic faucet is not in an optimal range, individuals tend to shorten their hand washing time. To obtain an optimal water temperature, a proper mixing ratio of hot and cold water and proper water actuation has to be achieved. Automatic faucets usually use an automatic valve that controls water flow after mixing.

There are numerous other applications in the chemical or food processing industries where there is a need to control fluid flow in multiple fluid lines by a single actuator.

SUMMARY OF THE INVENTION

The present invention relates to a valve device and a method for operating at least two valves actuated by an actuator and arranged for controlling fluid flow in at least two separate fluid lines.

According to one aspect, a valve device for simultaneously controlling fluid flow in separate fluid lines includes at least two diaphragm operated valves actuated by a single actuator and arranged for controlling fluid flow in at least two separate fluid lines. The valve device uses a pressure release mechanism constructed to change pressure in a diaphragm chamber of each diaphragm operated valve and thereby open or close the diaphragm operated valve.

According to another aspect, a valve device includes a main body, a pilot mechanism, and a check valve. The main body is constructed to receive a first valve that includes a first fluid input port and a first fluid output port, and a second valve that includes a second fluid input port and a second fluid output port. The pilot mechanism is constructed to simultaneously control flow of a first fluid between the first input and output ports and control flow of a second fluid between the second input and output ports. The check valve is cooperatively constructed with the pilot mechanism and arranged to prevent mixing of the first and second fluids.

According to yet another aspect, a valve device for simultaneously controlling fluid flow in separate fluid lines includes a first valve and a second valve and an automatic actuator and a manual actuator. The first valve includes a first fluid input port and a first fluid output port, and the second valve includes a second fluid input port and a second fluid output port. The automatic actuator is arranged to automatically control a pilot mechanism for simultaneously controlling flow of first fluid between the first input and output ports and flow of second fluid between the second input and output ports. The manual actuator is arranged to manually control the pilot mechanism.

Preferred embodiments of these aspects include one or more of the following features:

The device may include a check valve located at a pilot level of the diaphragm valve, wherein the check valve is constructed to prevent mixing of fluids from two separate fluid lines. The pressure release mechanism may include a fluid passage being in communication with each diaphragm chamber and being arranged to be simultaneously controlled by a movement of a single sealing member actuated by a single actuator. The fluid passage may be constructed to receive a spring and a ball arranged to prevent fluid crossflow between the two separate fluid lines.

The actuator of the valve device may be a manual actuator, an electromagnetic actuator or a bi-stable electromagnetic actuator. The single automatic actuator may include a manual override. The manual override may operate without electric power. The manual actuator may be constructed and arranged to manually switch position of the bistable solenoid. The actuator may include a solenoid constructed and arranged to move a plunger, wherein a sealing member may be located on the distal end of the plunger.

The valve device may be installed as part of a faucet, wherein the first of the fluid lines is arranged to convey hot water and the second of the fluid lines is arranged to convey cold water.

Preferably, the first and second valves are diaphragm operated valves and the pilot mechanism includes a pressure release mechanism constructed to simultaneously control pressure at each diaphragm and thereby open or close each diaphragm operated valve. The first and second valves can operate under a large differential pressure between the two input fluid lines (or output fluid lines), including no pressure in one fluid line. Preferably, the device is constructed with the differential pressure of about 20 psi, but the differential pressure may be even about 60 psi.

The main body may include a vent passage in communication with both the diaphragms including a ball and a spring forming a check valve. The main body may be constructed to have the diaphragm operated valves arranged symmetrically with respect to a pressure release mechanism. The pressure release mechanism may be constructed to simultaneously or sequentially lower pressure and thereby open each diaphragm operated valve. The manual actuator may be constructed and arranged to manually control pressure at the pressure release mechanism and thereby control pressure in a diaphragm chamber of each diaphragm operated valve.

Alternatively, at least one of the valves may be a diaphragm valve, a piston valve, a needle valve, a gate valve, a globe valve, or a butterfly valve. Each of the valves may be constructed to prevent occurrence of water hammer.

According to yet another aspect, an automatic faucet system includes a water outlet, an object sensor connected to a control circuit, a hot water pipe, a cold water pipe, and a valve device. The valve device has two valves actuated by a single automatic actuator for separately controlling flow of hot water and cold water based on signals received from the control circuit.

Preferred embodiments of these aspects include one or more of the following features:

The two valves may include a first diaphragm operated valve and a second diaphragm operated valve.

The device may include hot water input and output ports and cold water input and output ports, a pilot mechanism, and a check valve. The pilot mechanism simultaneously controls flow of hot water between the hot water input and output ports and flow of cold water between the cold water input and output ports. The check valve is co-operatively constructed with the pilot mechanism and arranged to prevent mixing of hot and cold water. The pilot mechanism may include a pressure release mechanism constructed to lower simultaneously pressure at each the diaphragm and thereby open each the diaphragm operated valve.

The main body of the valve device may be constructed to have the diaphragm operated valves arranged symmetrically with respect to the pressure release mechanism. The pressure release mechanism may include a fluid passage being in communication with each the diaphragm chamber and being arranged to be simultaneously controlled by a movement of a single sealing member actuated by a single automatic actuator.

The automatic actuator may include an electromagnetic actuator or a bi-stable electromagnetic actuator. The valve device may further include a manual actuator constructed to control flow of the hot water and the cold water independently of the automatic actuator. Alternatively, a manual actuator may be constructed to override the automatic actuator.

Furthermore, the above-described device may include three or more valves controlled by a single actuator. The manual actuator may be a manual override valve that resides in close proximity to the actuator and is coupled in parallel to the pressure release mechanism (i.e. in parallel to the hydraulic passages) controlled by the automatic actuator. The manual actuator provides a means for opening and closing the main valve by controlling the pressure when loss or electrical power or other failure disables the automatic actuator.

Alternatively, a valve device includes other types of valves, wherein again two valves are actuated by a single actuator. These valves may be a piston valve, a needle valve, a gate valve, a globe valve, or a butterfly valve. In general, the actuator may actuate two different types of valves.

In general, the valve device may be used for separately controlling the flow of any fluid, for dispensing separately two types of fluid, and/or for mixing two types of fluid at the same time.

DESCRIPTION OF THE PREFERRED EMBODIMENTS

Figure 1:
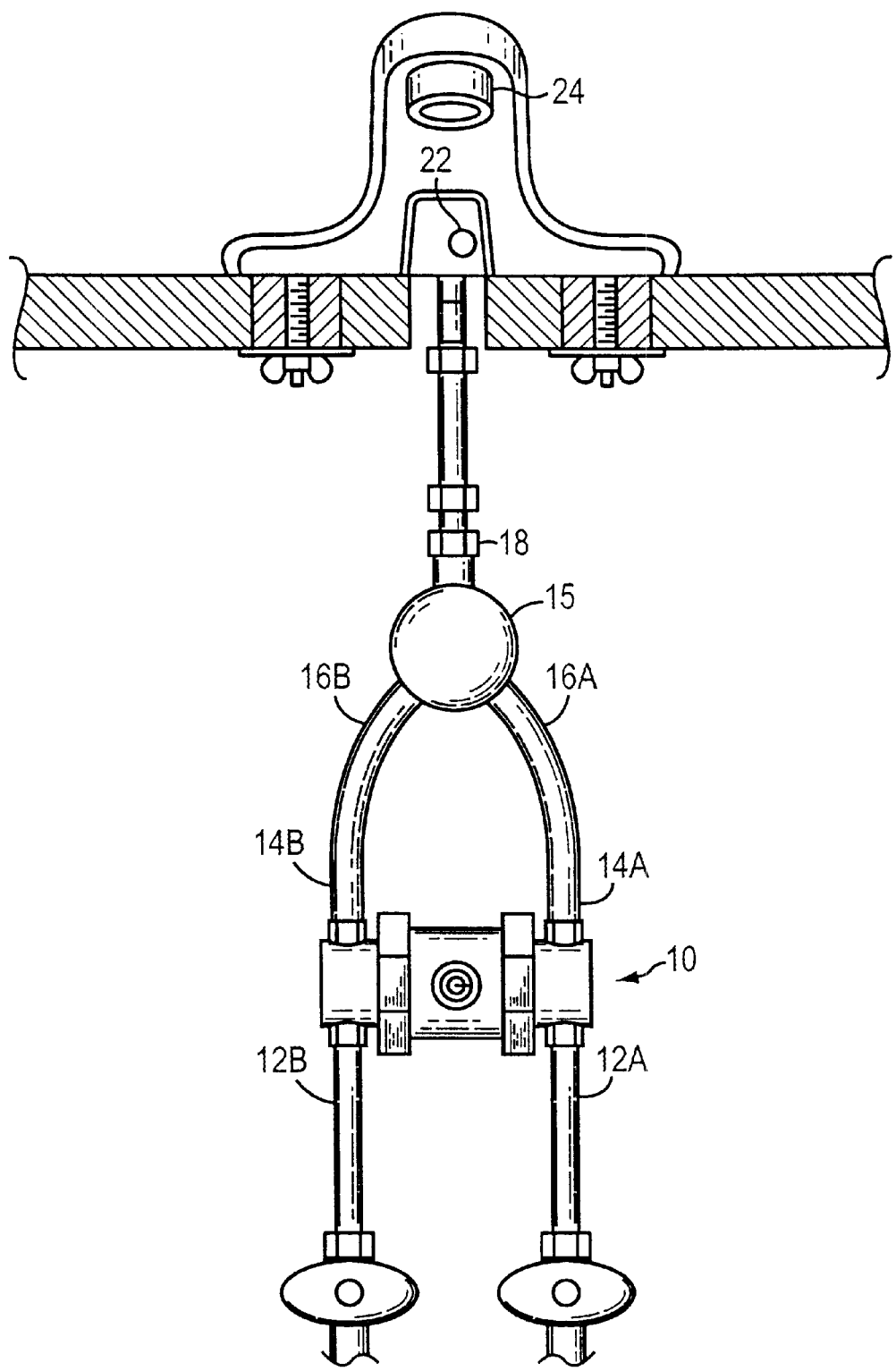
FIG. 1 shows schematically an automatic faucet system including a valve device for controlling separately flow of hot and cold water.

FIG. 1 illustrates a preferred use of a valve device that includes at least two valves actuated by a single actuator. The valve device controls fluid flowing separately in at least two separate fluid lines, and the valve device also prevents fluid cross-flow or mixing between the lines by employing a check valve.

Referring to FIG. 1, an automatic faucet system includes a valve device 10, a mixing valve 15, a sensor 22 and a faucet with an output 24. Valve device 10 is connected to pipes 12A and 14A for providing cold water and pipes 12B and 14B for providing hot water to mixing valve 15. Mixing valve 15 provides a selected mixture of hot and cold water to faucet output 24. Sensor 22 is connected to a sensing and control circuit, as described, for example, in U.S. Pat. No. 5,979,500. Alternatively, sensor 22 may include a fiberoptic coupling device for transmitting optical signal to a detector, as described in U.S. Pat. No. 5,984,262.

Sensor 22 detects a presence of an object or a change in the presence of an object (e.g., hands) at faucet output 24, and a control circuit in turn provides a signal to a solenoid (or another actuator). The solenoid actuates operation of valve device 10, which controls cold water flow from pipe 12A to pipe 14A and hot water flow from pipe 12B to pipe 14B without allowing any significant mixing of hot and cold water in device 10.

Figure 2:
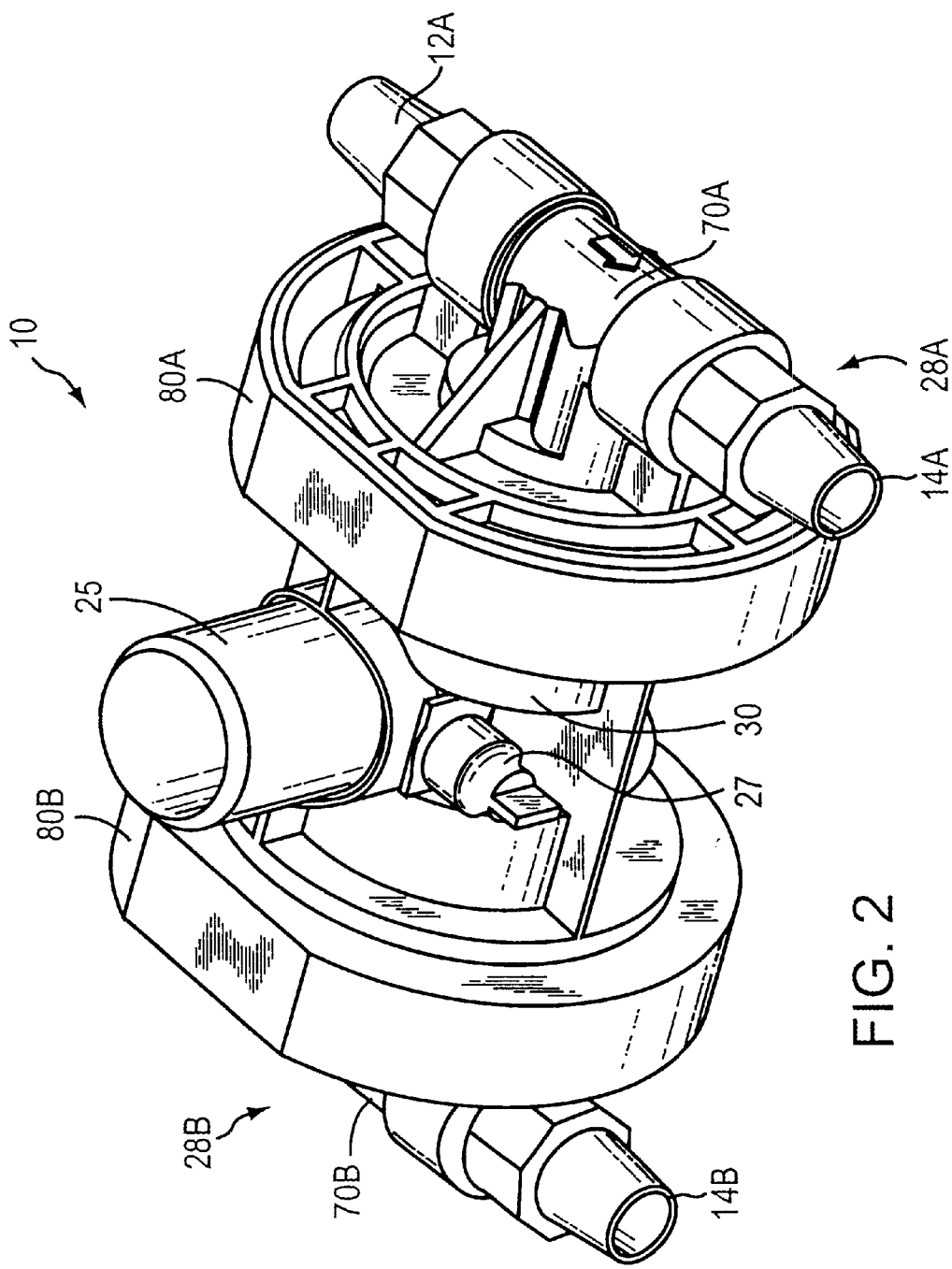
FIG. 2 is a perspective view of the valve device for controlling separately fluid flow in two pipes.
Figure 2A:
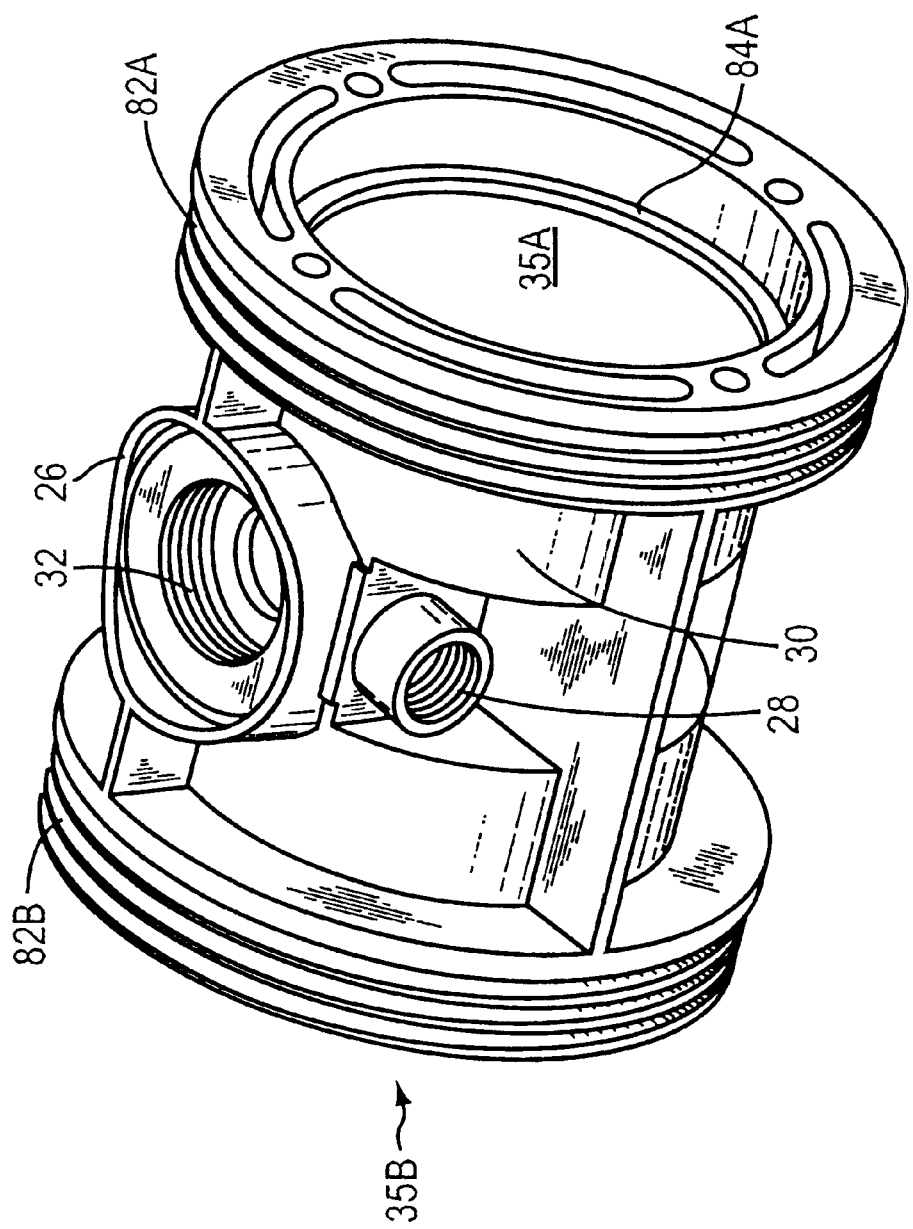
FIG. 2A is a perspective view of the body of the valve device shown in FIG. 2.

Referring to FIG. 2, valve device 10 includes an automatic actuator 25 and a manual actuator 27 for controlling simultaneously two diaphragm valves 28A and 28B. As shown in FIG. 2A, automatic actuator 25 (FIG. 2) is located at an actuator port 26 and is connected to threads 32. Manual actuator 27 is connected to a manual port 28. Manual actuator 27 includes a manual override valve that resides in close proximity to automatic actuator 25 and is coupled in parallel to the pressure release mechanism (i.e. in parallel to the hydraulic passages) controlled by automatic actuator 25. Specifically, manual actuator 27 is connected to vent port 39, which is in communication with a passage 36, as described in connection with and shown in FIG. 3D. Manual actuator 27 provides a means for opening and closing of the two diaphragm valves 28A and 28B by controlling the pressure when loss of electrical power or other failure disables the automatic actuator.

Figure 3:
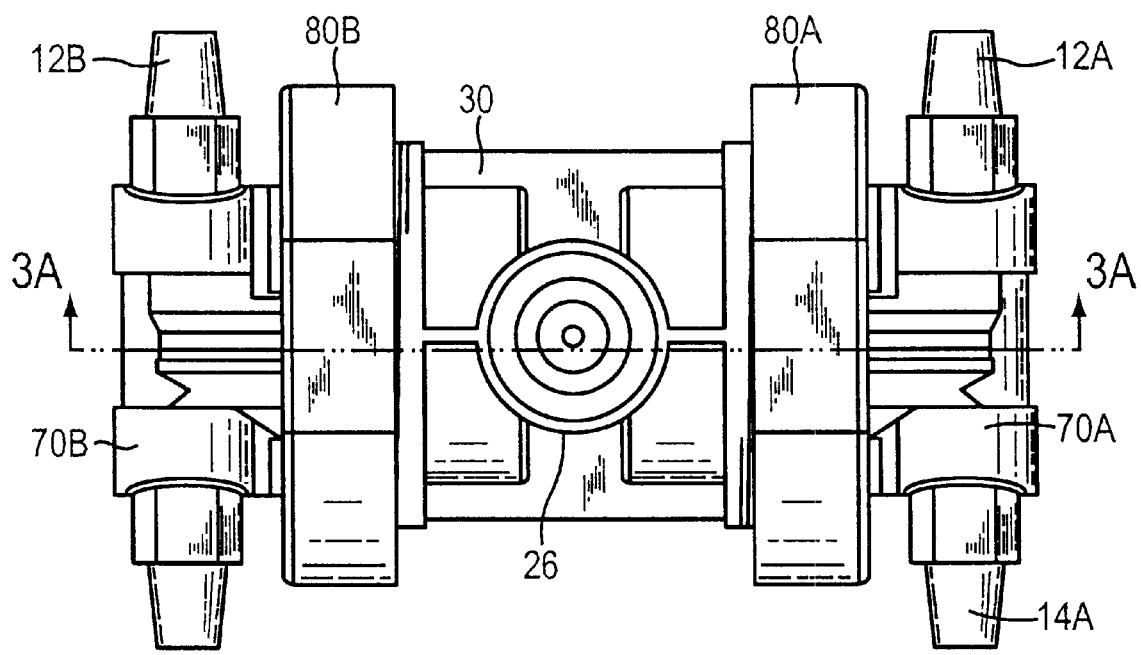
FIG. 3 is a top view of the valve device shown in FIG. 2.
Figure 3A:
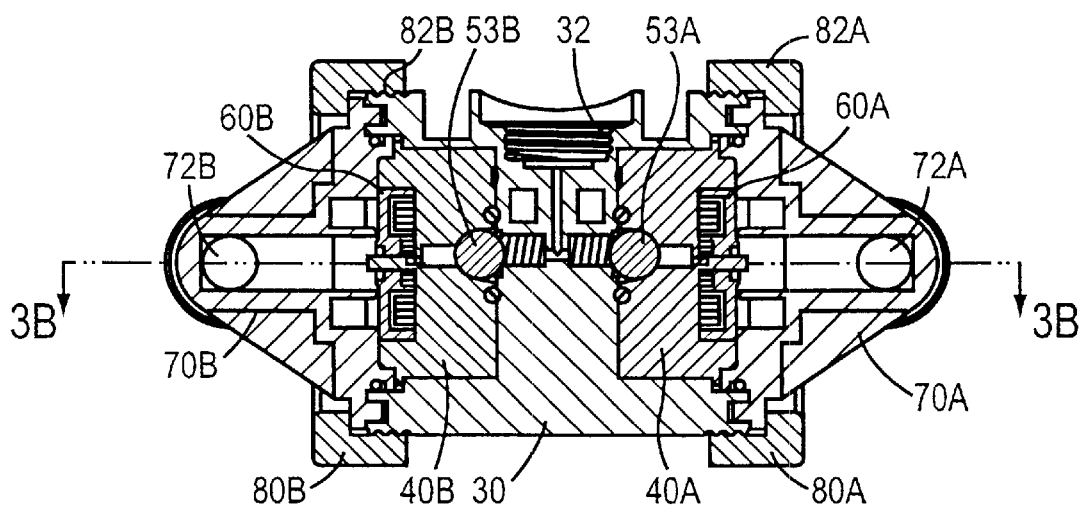
FIG. 3A is a cross-sectional view of the valve device shown along a line 3A—3A in FIG. 3.
Figure 3B:
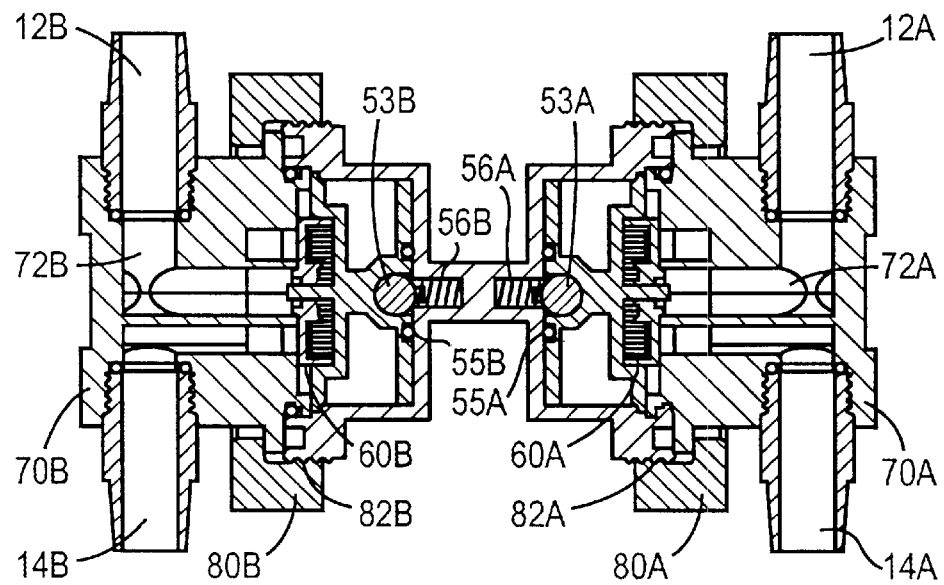
FIG. 3B is a cross-sectional view of the valve device shown along a line 3B—3B in FIG. 3A.

Referring to FIGS. 3 through 3B, valve device 10 is constructed to operate with a single solenoid (automatic actuator 25) which controls simultaneously two diaphragm valves 28A and 28B. Valve device 10 includes a main body 30, two diaphragm holders 40A and 40B, two diaphragms 60A and 60B, and two end caps 70A and 70B, attachable to main body 30 by respective rings 80A and 80B. Main body 30 (also shown in FIG. 3C and 3D) includes a threaded actuator port 32 and control passages 34 and 36. Control passages 34 and 36 are used for controlling diaphragm valves 28A and 28B, which are arranged substantially symmetrically with respect to actuator port 32. In the following description, we describe in detail only diaphragm valve 28A since diaphragm valve 28B has a similar design and elements, as shown in FIGS. 3A and 3B.

Figure 4:
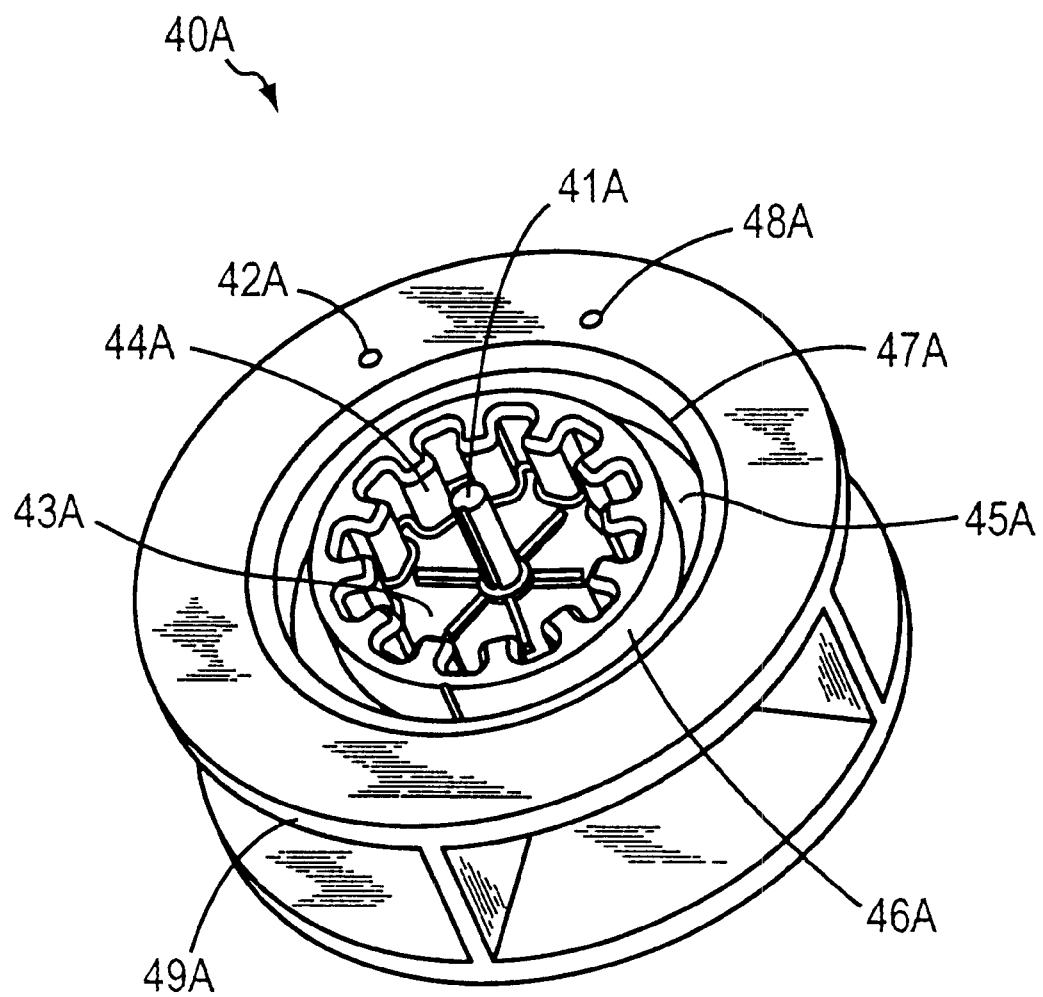
FIG. 4 is a perspective view of one of two diaphragm holders used in the valve device shown in FIGS. 2 and 3 through 3B.
Figure 4A:
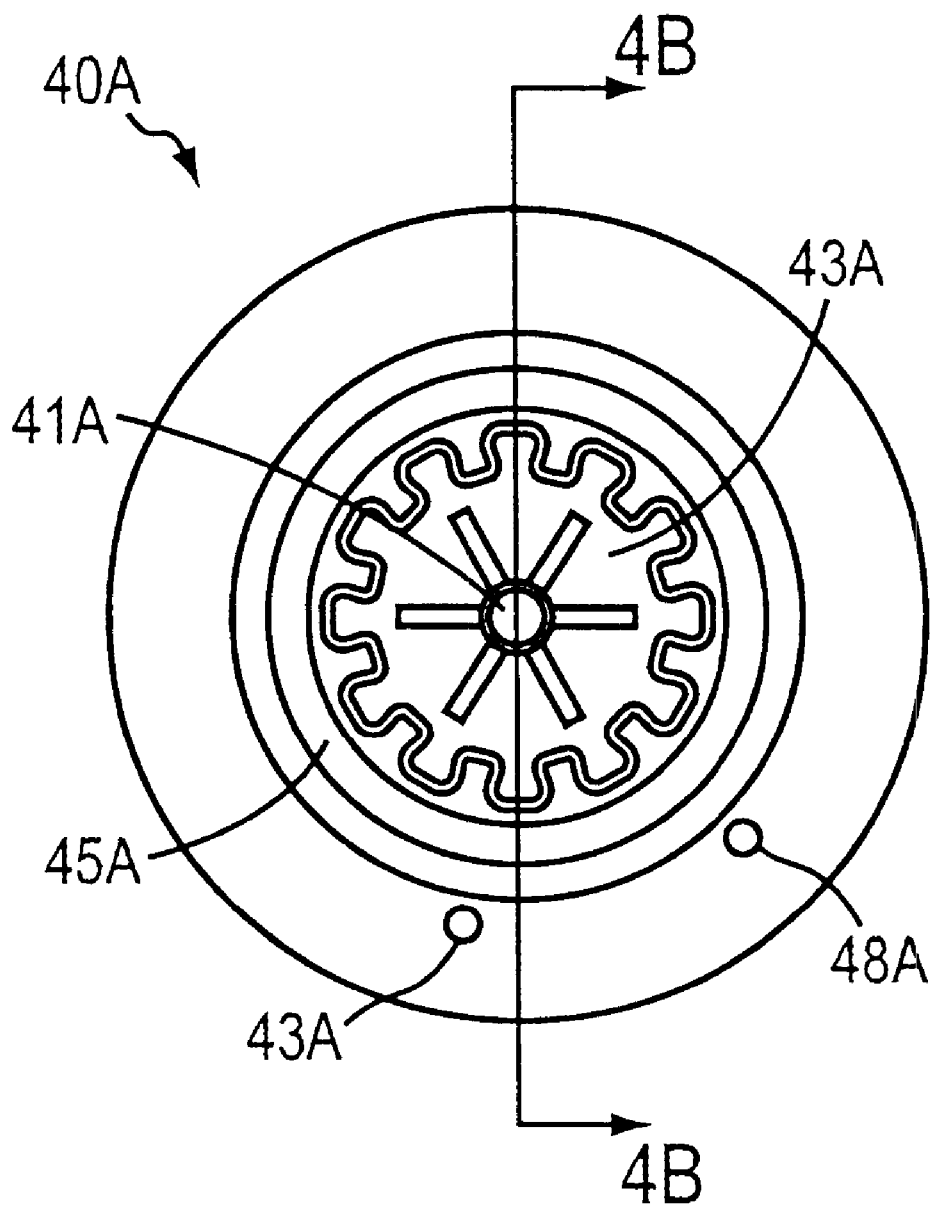
FIG. 4A is a top view of the diaphragm holder shown in FIG. 4A.
Figure 4B:
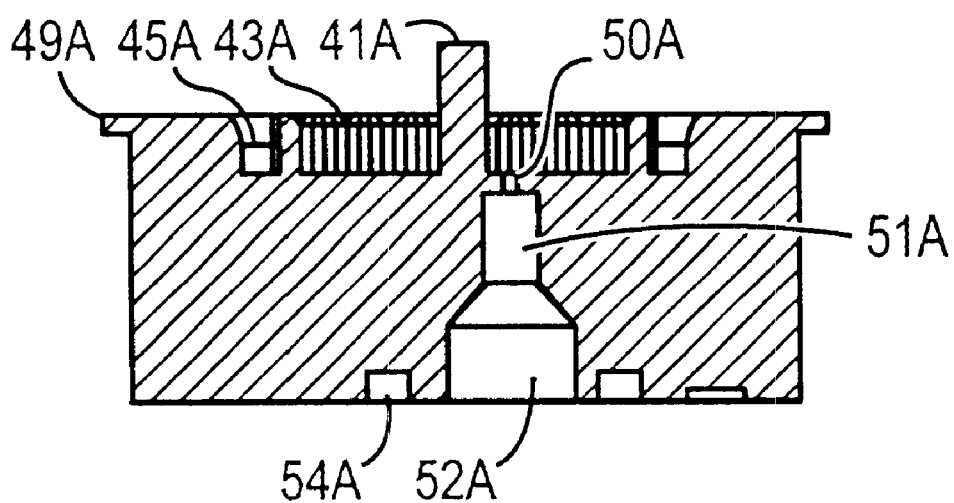
FIG. 4B is a cross-sectional view of the diaphragm holder shown along a line 4B–4B in FIG. 4A.

Referring to FIGS. 4, 4A and 4B, diaphragm holder 40A includes a guide pin 41A, a fluid chamber 43A, a groove 45A, formed by an inner cylindrical wall 46A and an outer cylindrical wall 47A, and a circular edge 49 A. Fluid chamber 43A includes walls 44A disposed symmetrically around guide pin 41A. Inner and outer cylindrical walls 46A and 47A are disposed concentrically about guide pin 41A. Guide pin 41A includes a groove 42A for providing a fluid passage 68A described in connection with FIG. 6A. Diaphragm holder 40A also includes a control passage 50A, a ball seat 52A, and an o-ring groove 54A. Control passage 50A is in communication with a passage 51A and ball seat 52A, as shown in FIG. 4B.

Figure 3C:
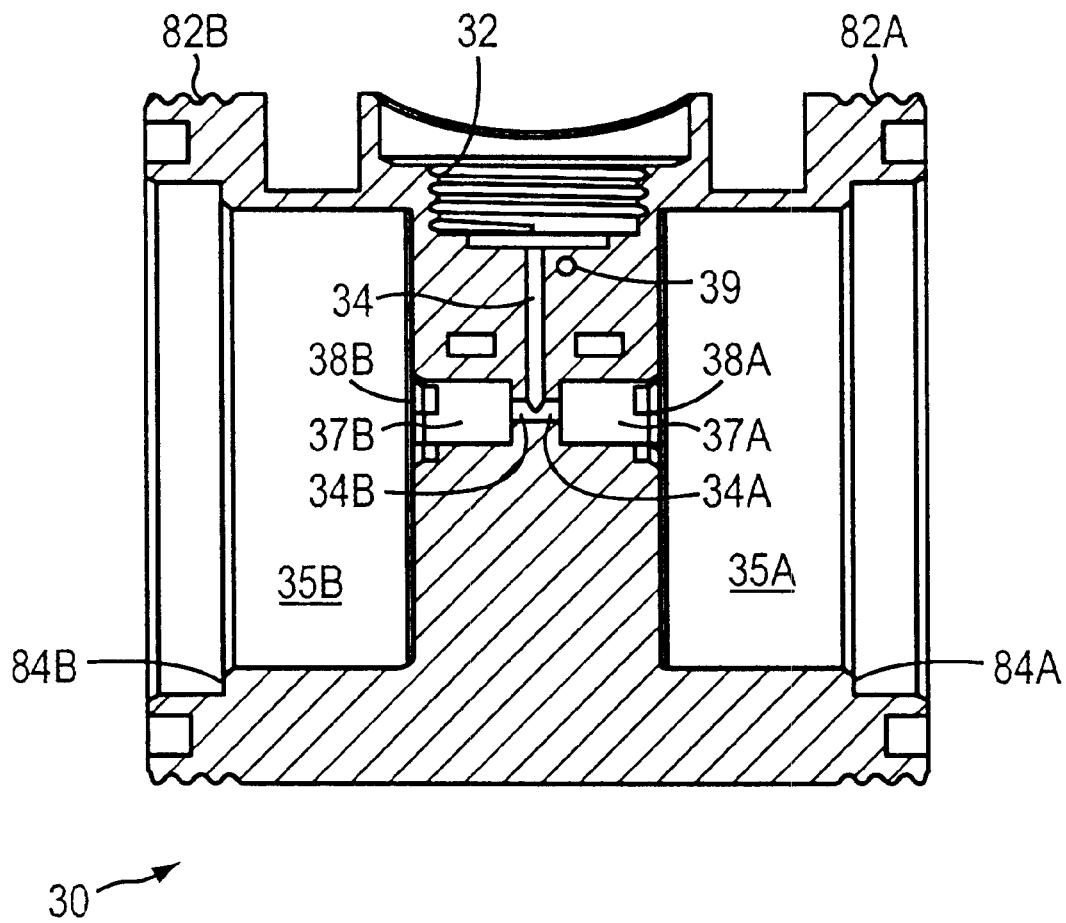
FIG. 3C is a cross-sectional view showing in detail only a main body of the valve device shown in FIG. 3A.
Figure 3D:
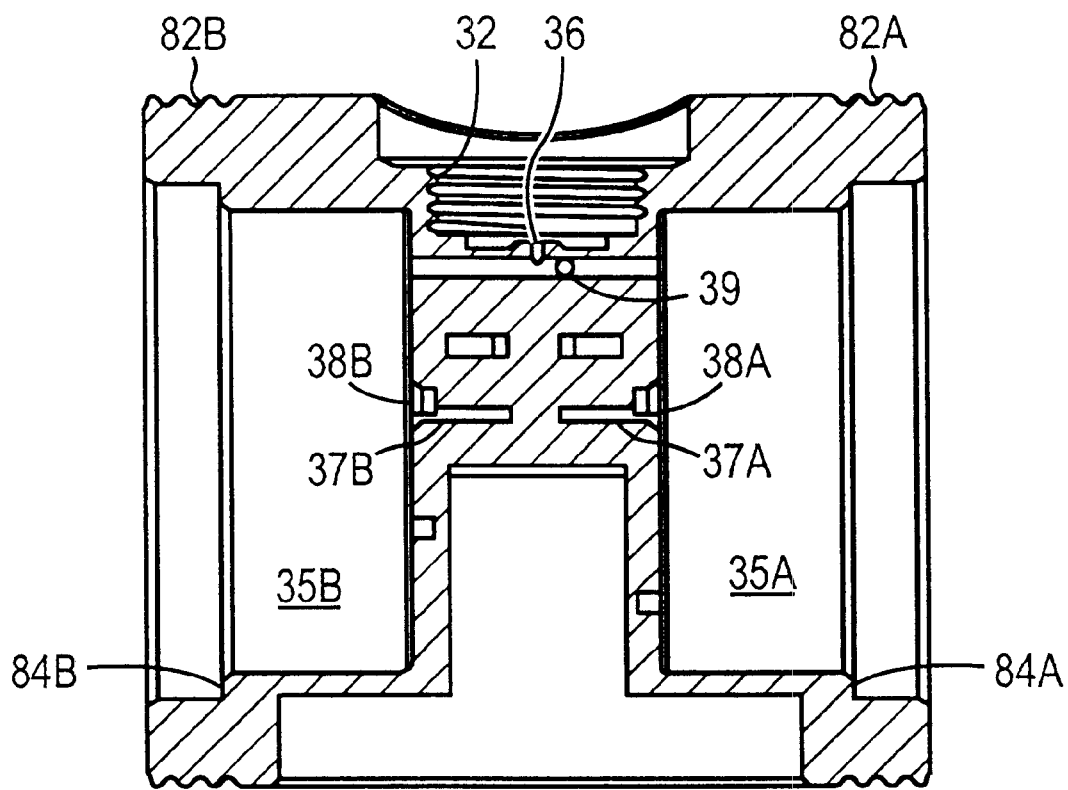
FIG. 3D is another cross-sectional view showing in detail only the main body of the valve device.
Figure 3E:
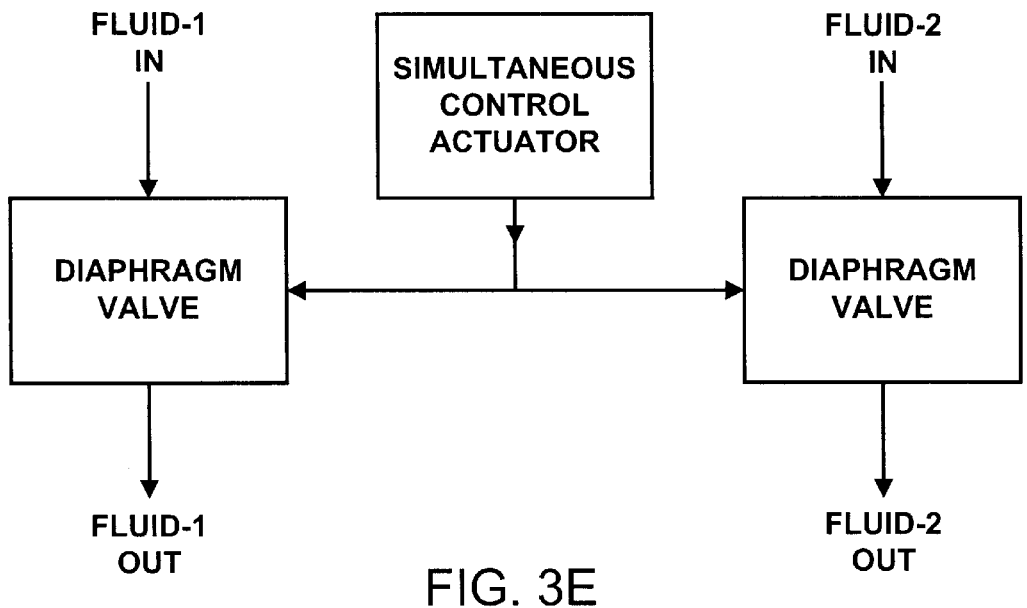
FIGS. 3E and 3F show diagrammatically the valve device of FIG. 2 including two diaphragm valves and two piston valves, respectively, for controlling separately fluid flow in two pipes.
Figure 3F:
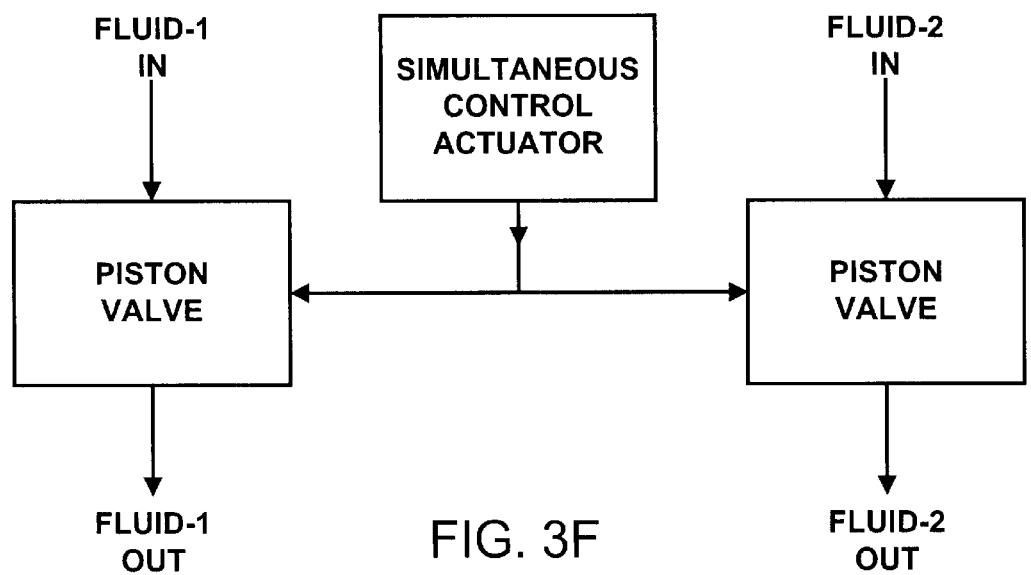

FIGS. 3C and 3D are two parallel cross-sectional views of main body 30. Main body 30 receives diaphragm holders 40A and 40B inside cavities 35A and 35B, respectively. Main body also includes ball seats 38A and 38B. Ball seat 38A includes a rubber ball 53A located between diaphragm holder 40A and main body 30. Ball seat 38B includes a rubber ball 53B located between diaphragm holder 40B and main body 30. Control passage 37A receives spring 56A located inside and positioned in contact with rubber ball 53A. Control passage 34 is arranged in communication with bores 37A and 37B, which receive springs 56A and 56B located inside and positioned in contact with rubber balls 53A and 53B, respectively.

Circular surface 49A (FIG. 4) rests on a surface 84A, and an O-ring 55A, located in o-ring groove 54A, provides a seal between diaphragm holder 40A and main body 30. Similarly, an O-ring 55B provides a seal between diaphragm holder 40B and main body 30. Threaded rings 80A and 80B are tightened over threaded surfaces 82A and 82B, respectively.

Referring specifically to FIGS. 4A and 4B, control passages 50A and 51A communicate with fluid chamber 43A, which is used for valve control. Diaphragm holder 40A confines diaphragm 60A (FIG. 6) positioned between diaphragm holder 40A and end caps 70A, as described below. Diaphragm holder 40B includes substantially the same elements as diaphragm holder 40A and performs substantially the same function. The elements of diaphragm holder 40B are referred to by the same number in combination with the letter "B". When diaphragm holders 40A and 40B are assembled together with main body 30, springs 56A and 56B passages 50A and 50B and rubber balls 53A and 53B form a check valve that prevents water cross-flow between diaphragm valve 28A and diaphragm valve 28B.

Figure 5:
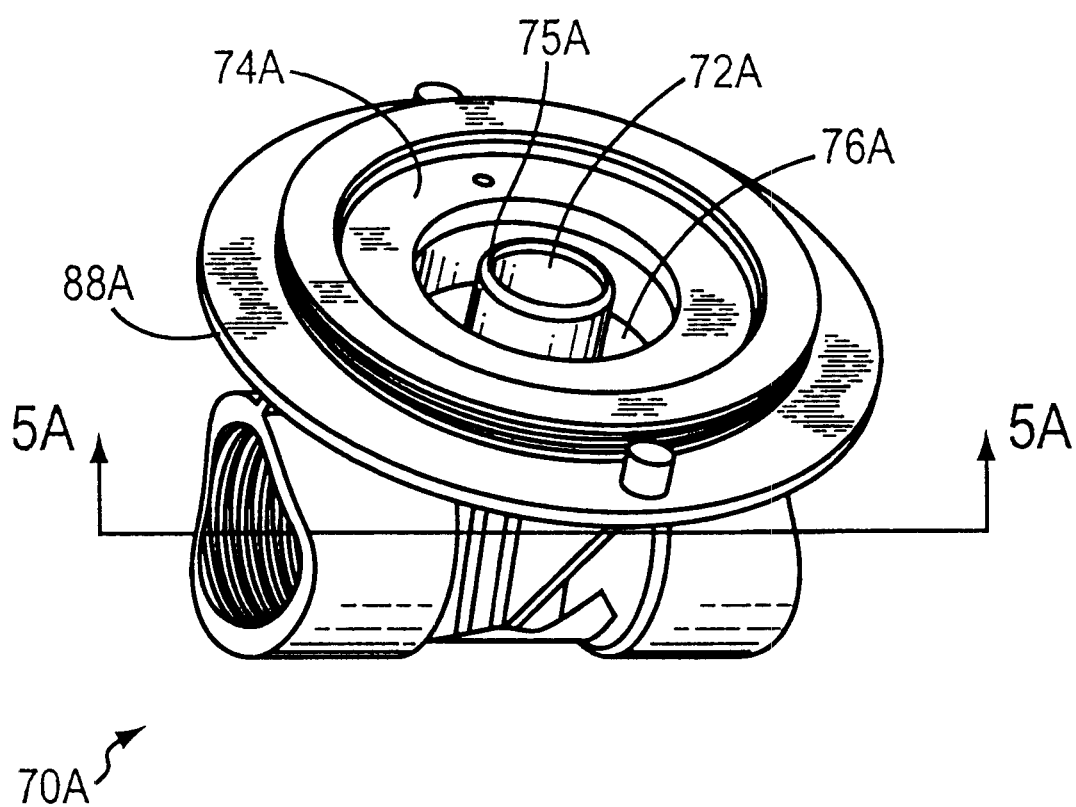
FIG. 5 is a perspective view of one of two end caps used in the valve device shown in FIGS. 2 and 3 through 3B.
Figure 5A:
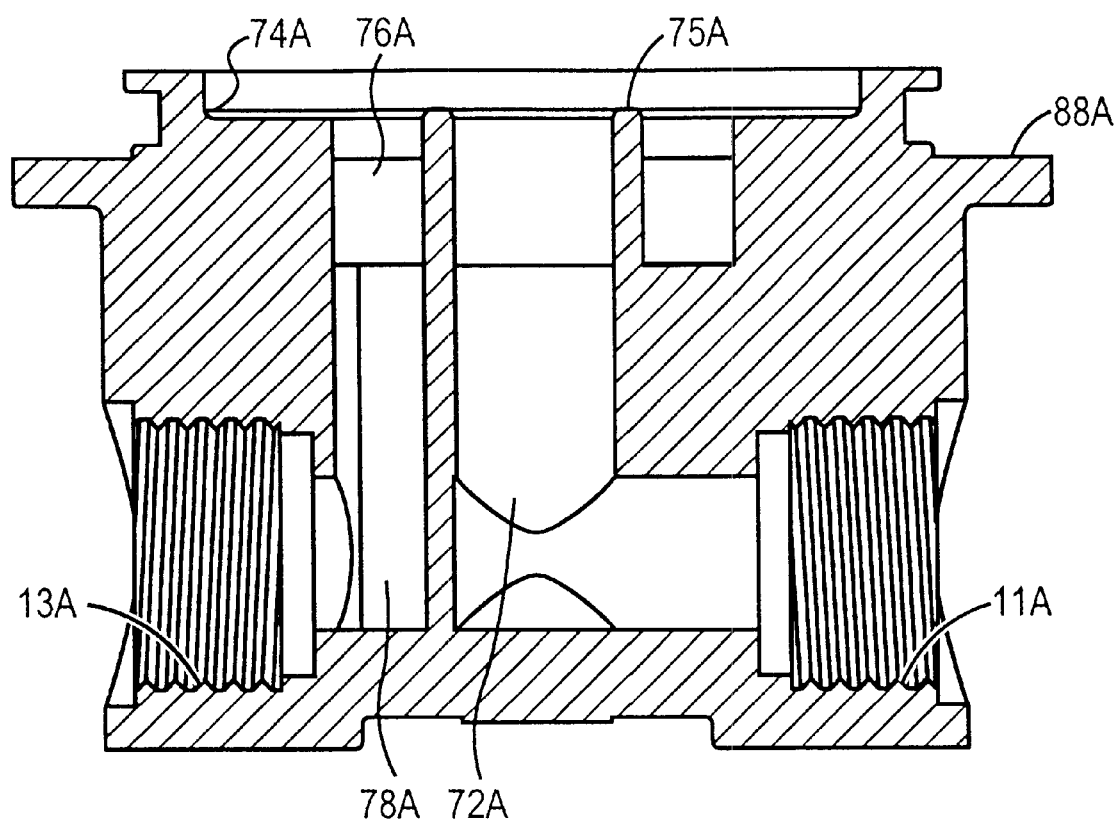
FIG. 5A is a cross-sectional view of the end cap shown along a line 5A–5A in FIG. 5.

Since end caps 70A and 70B have substantially the same construction, both end caps will be described by referring only to end cap 70A. Referring to FIGS. 5 and 5A, end cap 70A includes a threaded input port 11A, a threaded output port 13A, an input passage 72A, a diaphragm seat 74A, a raised annular lip 75A and a coaxially extending channel 76A leading from diaphragm seat 74A to an annular output chamber 78A. Raised annular lip 75A is formed axially with respect to input passage (i.e., fluid conduit) 72A and is used for sealing passage 72A. Input port 11A and input passage 72A provide fluid up to diaphragm membrane 60A. Coaxially extending channel 76A and annular output chamber 78A are designed to provide fluid to and discharge the fluid through output port 13A. End cap 70B includes substantially the same elements as end cap 70A and performs substantially the same function.

Figure 6:
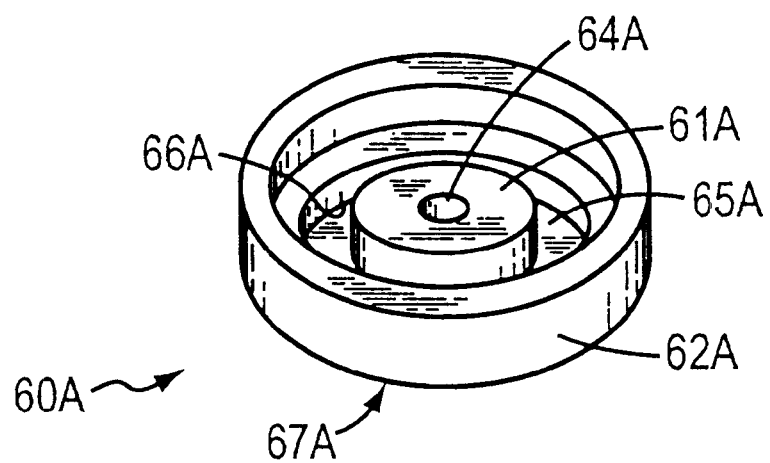
FIG. 6 is a persective view of a diaphragm used in the valve device shown in FIGS. 3A and 3B.
Figure 6A:
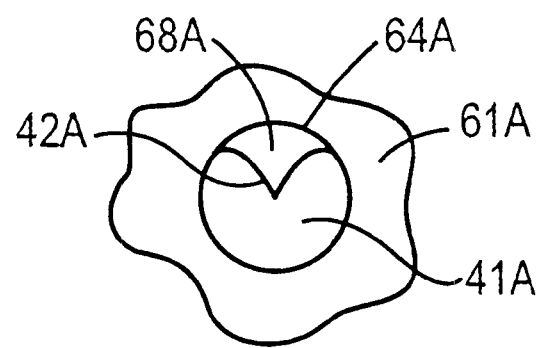
FIG. 6A is a detailed cross-sectional view of the center of the diaphragm shown in FIG. 6.

Referring to FIG. 6, diaphragm 60A is made from a suitable elastomeric material and includes an inner, stiffer hub section 61A, an outer ring-like section 62A, and a central opening (hole) 64A for receiving therethrough guide pin 41A, shown in FIGS. 3 and 3A. Referring also to FIG. 6A, guide pin 41A includes V-groove 42A, which together with opening 64A forms a fluid passage 68A that enables fluid flow from input passage 72A to fluid chamber 43A during the valve operation.

Hub section 61A is interconnected to a flexible, radially extending membrane 65A, which in turn is connected to up-standing, radially outwardly disposed, cylindrical ring 62A. Central opening 64A is the only hole through diaphragm 60A. Diaphragm holder 40A receives ring section 62A of diaphragm 60A in compression and thereby retains the interfitted wall of ring section 62A inside annular groove 45A, in a resilient, preloaded elastomeric manner. Radially extending membrane 65A includes a first surface 66A directed toward chamber 43A and second surface 67A directed toward input passage 72A. Diaphragm 60A and end cap 70A are cooperatively constructed so that, when located on diaphragm holder 40A, second surface 67A of diaphragm 60A can seal input passage 72A at annular lip 75A (FIG. 5A). Diaphragm 60B includes substantially the same elements as diaphragm 60A and performs substantially the same function.

The entire operation of valve device 10 is controlled by a single actuator (not shown in the drawings) that includes a solenoid, such as the bistable solenoid model no. AXB724 available from Arichell Technologies Inc., West Newton, Mass. In general, a number of solenoid valves may be used such as described in U.S. Pat. No. 4,225,111. An alternative bistable solenoid is described in U.S. Pat. Nos. 5,883,557 or 5,599,003. The bistable solenoid includes a solenoid coil that energizes a plunger for closing or opening vent passage 36. The plunger includes a wear resistant plunger tip, preferably made of elastomeric material constructed to seal passages 34 and 36.

Referring to FIGS. 1, 3A and 3B, water enters from input pipe 12A into input passage 72A, which is sealed by diaphragm surface 67A, in the closed state, except for the passage 68A (FIG. 6A). A small amount of water flows through passage 68A and fills chamber 43A, which is sealed in the closed state. Thus, diaphragm 60A resists the pressure caused by the input water line 12A because passage 68A allows substantial pressure equalization to occur between input passage 72A and fluid chamber 43A. Diaphragm 60A is shaped to have first surface 66A larger than second surface 67A located in contact with the input water passage 72A. Therefore, assuming about the same fluid pressure in input passage 72A and in fluid chamber 43A, membrane 65A provides a net force toward input passage 72 and seals this passage at lip 75A. That is, the force difference keeps the valve closed.

To open diaphragm valve 28A, a pressure-relief mechanism described below relieves the pressure in the pilot chamber, i.e., fluid chamber 43A. For example, a bistable solenoid energizes and retracts a plunger that seals passage 36. Thus, after retracting, the plunger relieves the water pressure in chamber 43A causing a net force directed toward chamber 43A and thus a movement of membrane 65A (of diaphragm 60A) toward chamber 43A. That is, second surface 67A of diaphragm 60A no longer presses against lip 75A and thus no longer seals input passage 72A at lip 75A. Water flows from input passage 72A around lip 75A through the set of coaxially extending channels created in communication with output chamber 78A.

Simultaneously with pressure drop in fluid chamber 43A, there is a pressure drop in fluid chamber 43B of diaphragm valve 28B, which operates substantially the same way as diaphragm 28A. The pressure drop in chamber 43B causes a net force directed toward chamber 43B and thus the second surface of diaphragm 60B no longer seals input water line 12B and input passage 72B. Therefore, water flows from input passage 72B around a lip (identical to lip 75A) through the set of coaxially extending channels created in communication with an output chamber 78B. Thus both valves are in the open state.

In the open state, fluid flows from fluid chamber 43A through diaphragm holder passages 50A and 51A, around ball 53A located in seat 52A and through passages 37A and 34 shown in FIG. 3C. The check valve, including balls 53A and 53B and springs 56A and 56B, prevents this fluid from flowing to the other side diaphragm holder passages, around ball 53B. Referring to FIGS. 3C and 4B, passage 51A is about 0.015 inch, passages 37A and 37B are about 0.164 inch, passages 34A and 34B are about 0.015 inch and passage 34 is about 0.050 inch. This passage sizes enable pressure isolation between valves 28A and 28B and also enable operation at large pressure differentials. Also referring to FIG. 3D, in the open state, fluid flows from passage 34 through passage 36 and through another passage in the body of diaphragm holders 40A and 40B. Diaphragm holder 40A includes a port 48A, which provides this fluid to annular chamber 76A. Diaphragm holder 40A includes a port 42A for venting fluid during the open state of manual actuator 27.

To close diaphragm valves 28A and 28B, a bistable solenoid moves a plunger to seal passages 34 and 36. Water from input pipe 12A flows into input passage 72A and flows inside passage 68A (FIG. 6A) to fluid chamber 43A. After fluid chamber 43A is filled, the pressure is substantially equalized between input passage 72A and fluid chamber 43A. As described above, assuming about the same fluid pressure in input passage 72A and in fluid chamber 43A, membrane 65A provides a net force toward input passage 72 and seals this passage at lip 75A. Similarly, membrane 67B of diaphragm 60B seals the water input and prevents water flow from line 12B to line 14B.

The opening and closing of valves 28A and 28B is controlled by a single actuator that seals fluid chambers 43A and 43B, or decreases the pressure in fluid chambers 43A and 43B. The lead time for closing or opening the valves depends also on the stiffness of membranes 65A and 65B, and is preferably about 40 msec. to 60 msec. In general, valves 28A and 28B are designed to avoid the water hammer effect during opening or closing.

Alternatively, valve device 10 may include three or more diaphragm valves for controlling flow through three fluid conduits. For example, valve device 10 may have the main body constructed to receive three diaphragm holders located 90 degrees with respect to each other (rather than two diaphragm holders aligned 180 degrees as shown in FIGS. 3 through 3B). Each of the three diaphragm holders would then receive a diaphragm and an end cap as described above. Alternatively, two diaphragm valves may be arranged in series with each other so that, in stages, a smaller diaphragm actuates a larger diaphragm.

Alternatively, a valve device includes other types of valves actuated by a single actuator. These valves may be a piston valve, a needle valve, a gate valve, a globe valve, or a butterfly valve. In general, the actuator may actuate two different types of valves.

While the invention has been described with reference to the above embodiments, the present invention is by no means limited to the particular constructions described and/or shown in the drawings. The present invention also comprises any modifications or equivalents within the scope of the following claims.

What is claimed is:

1. A valve device for simultaneously controlling fluid flow in separate fluid lines, comprising at least two diaphragm operated valves actuated by a single electromagnetic actuator arranged to seal a single passage for controlling fluid flow in at least two separate fluid lines using a pressure release mechanism constructed to simultaneously reduce pressure in a diaphragm chamber of each said diaphragm operated valve and thereby open each said diaphragm operated valve.

2. A valve device for simultaneously controlling fluid flow in separate fluid lines, comprising at least two diaphragm operated valves actuated by a single electromagnetic actuator arranged to seal a single passage for controlling fluid flow in at least two separate fluid lines using a pressure release mechanism constructed to simultaneously reduce pressure in a diaphragm chamber of each said diaphragm operated valve and thereby open each said diaphragm operated valve, wherein said actuator is a bi-stable electromagnetic actuator.

3. A valve device for simultaneously controlling fluid flow in separate fluid lines, comprising at least two diaphragm operated valves actuated by a single actuator and arranged for controlling fluid flow in at least two separate fluid lines using a pressure release mechanism constructed to simultaneously reduce pressure in a diaphragm chamber of each said diaphragm operated valve and thereby open each said diaphragm operated valve, wherein said pressure release mechanism includes a fluid passage being in communication with each said diaphragm chamber and being arranged to be simultaneously controlled by a movement of a single sealing member actuated by said single actuator, wherein said sealing member is located on a distal end of a plunger.

4. The valve device of claim 1 wherein said actuator includes a solenoid constructed and arranged to move a plunger.

5. The valve device of claim 1 wherein said fluid lines include a first of said fluid lines is arranged to convey hot water and a second of said fluid lines is arranged to convey cold water.

6. A valve device for simultaneously controlling fluid flow in separate fluid lines, comprising:
    a first valve including a first fluid input port and a first fluid output port, and a second valve including a second fluid input port and a second fluid output port;
    an automatic actuator arranged to automatically control a pilot mechanism for simultaneously controlling flow of first fluid between said first input and output ports and flow of second fluid between said second input and output ports; and
    a manual actuator arranged to manually control said pilot mechanism.

7. The valve device of claim 6 further including a check valve co-operatively constructed with said pilot mechanism and arranged to prevent mixing of said first and second fluids.

8. The valve device of claim 6 wherein said first and second valves are diaphragm operated valves and said pilot mechanism includes a pressure release mechanism constructed to simultaneously change pressure in a diaphragm chamber of each said diaphragm operated valve.

9. The valve device of claim 8 wherein said pressure release mechanism is constructed to simultaneously lower pressure and thereby open each said diaphragm operated valve.

10. The valve device of claim 6 wherein each of said first and second valves includes a piston for opening or closing said valve.

11. The valve device of claim 6 wherein said automatic actuator includes an electromagnetic actuator.

12. The valve device of claim 6 wherein said automatic actuator includes a bistable solenoid.

13. The valve device of claim 12 wherein said manual actuator is constructed and arranged to manually switch position of said bistable solenoid.

14. The valve device of claim 6 wherein said first and second valves are diaphragm operated valves and said pilot mechanism includes a pressure release mechanism, said manual actuator being constructed and arranged to manually control pressure at said pressure release mechanism and thereby control pressure in a diaphragm chamber of each said diaphragm operated valve.

15. The valve device of claim 14 wherein said manual actuator is constructed and arranged to manually lower pressure at said pressure release mechanism and thereby open each said diaphragm operated valve.

16. An automatic faucet system including a water outlet;

an object sensor connected to a control circuit;

hot water input and output ports connected to a hot water pipe, cold water input and output ports connected to a cold water pipe;

a valve device having two valves, comprising a first diaphragm operated valve and a second diaphragm operated valve;

a pilot mechanism for simultaneously controlling flow of hot water between said hot water input and output ports and flow of cold water between said cold water input and output ports;

a check valve co-operatively constructed with said pilot mechanism and arranged to prevent mixing of hot and cold water a single automatic actuator for separately controlling flow of hot water and cold water based on signals received from said control circuit wherein said pilot mechanism includes a pressure release mechanism constructed to lower simultaneously pressure at each said diaphragm and thereby open each said diaphragm operated valve.

17. The automatic faucet system of claim 16 wherein said main body is constructed to have said diaphragm operated valves arranged symmetrically with respect to said pressure release mechanism.

18. The automatic faucet system of claim 16 wherein said pressure release mechanism includes a fluid passage being in communication with each said diaphragm chamber and being arranged to be simultaneously controlled by a movement of a single sealing member actuated by said single automatic actuator.

19. An automatic faucet system including a water outlet, an object sensor connected to a control circuit, a hot water pipe, a cold water pipe, and a valve device having two valves actuated by a single automatic actuator for separately controlling flow of hot water and cold water based on signals received from said control wherein said single automatic actuator includes a manual override.

20. The automatic faucet system of claim 19 wherein said manual override operates without electric power.

21. An automatic faucet system including a water outlet, an object sensor connected to a control circuit, a hot water pipe, a cold water pipe, and a valve device having two valves actuated by a single automatic actuator for separately controlling flow of hot water and cold water based on signals received from said control circuit wherein said valve device further includes a manual actuator constructed to control flow of said hot water and said cold water independently of said automatic actuator.

* * * * *